June 12, 1923.
E. F. FAY
CASTER
Filed Nov. 10, 1921
1,458,812
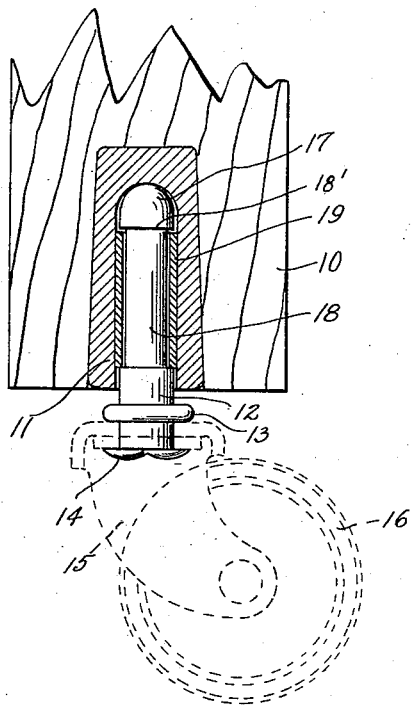
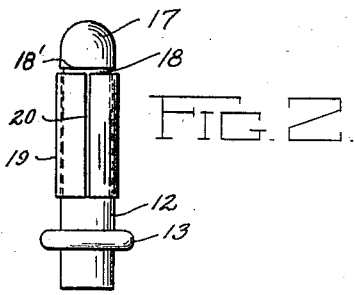
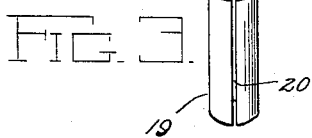
INVENTOR.
Edward F. Fay.
BY Wooster & Davis
ATTORNEYS.

Patented June 12, 1923.

1,458,812

UNITED STATES PATENT OFFICE.

EDWARD F. FAY, OF MERIDEN, CONNECTICUT, ASSIGNOR TO FOSTER, MERRIAM AND COMPANY, OF MERIDEN, CONNECTICUT, A CORPORATION OF CONNECTICUT.

CASTER.

Application filed November 10, 1921. Serial No. 514,289.

*To all whom it may concern:*

Be it known that I, EDWARD F. FAY, a citizen of the United States, residing at Meriden, county of New Haven, State of Connecticut, have invented an Improvement in Casters, of which the following is a specification.

This invention relates to casters and has for an object to provide an improved means for securing the pintle in the socket.

It is also an object of the invention to provide securing means for the pintle which will allow easy insertion and removal of the pintle, but still will securely hold the same in the socket.

It is a further object of the invention to provide a device of this character which will be simple in construction and, therefore, easy and cheap to manufacture.

With these and other objects in view I have devised the construction illustrated in the accompanying drawing, in which—

Fig. 1 is a vertical section through the caster socket with the pintle therein shown in elevation, the outline of the horn and roller being shown in dotted lines.

Fig. 2 is a side elevation of the pintle and securing means removed from the socket.

Fig. 3 is a perspective view of the securing sleeve, and

Fig. 4 is an end view thereof.

Reference numeral 10 represents the leg of a piece of furniture recessed to receive the metal socket 11 adapted to receive the pintle 12 of a caster, this pintle being secured by any suitable means such as a flange 13 and a riveted over end 14, to the horn 15 carrying the wheel 16. The pintle is shown as rounded at its upper end 17 to provide a top bearing against the inner end of the recess in the socket. This top bearing may, however, be provided by other means, if desired. The intermediate portion of the pintle within the socket is reduced in diameter at 18 to receive the retaining sleeve 19 and to provide a shoulder 18'. This sleeve is a formed sleeve and is provided with a slot 20 at one side. The outside diameter is somewhat larger than the diameter of the socket so that when the pintle and sleeve is inserted in the socket, the sleeve is compressed and, due to its resiliency, it tends to expand and press its outer surface against the inner surface of the socket. Thus it will be seen the caster is frictionally held in place, as the shoulder 18' coacts with the top of the sleeve to prevent withdrawal of the pintle from this sleeve.

The pintle is reduced sufficiently at 18 to allow free turning movement in the sleeve, and the top bearing provides very little friction so that the caster is very free turning. It will be apparent that the device is very simple in construction, and that the caster is very effectively held in position.

Having thus set forth the nature of my invention, what I claim is:

A caster comprising a socket member having a substantially cylindrical socket therein, a pintle reduced in diameter for the greater portion of its length to provide shoulders adjacent its inner and outer ends, a substantially cylindrical, resilient retaining sleeve embracing the reduced portion of the pintle and split longitudinally throughout its length and at one side only, said sleeve forming a bearing for the pintle throughout substantially its entire length and being normally of greater diameter than the socket so that when it is inserted in the same it frictionally engages the walls of the socket, and said pintle being also provided with a top bearing in the socket and a side bearing in the socket below said sleeve.

In testimony whereof I affix my signature.

EDWARD F. FAY.